United States Patent
Beaumont et al.

(10) Patent No.: US 9,342,501 B2
(45) Date of Patent: May 17, 2016

(54) PRESERVING EMOTION OF USER INPUT

(71) Applicant: Lenovo (Singapore) Pte. Ltd., Singapore (SG)

(72) Inventors: Suzanne Marion Beaumont, Wake Forest, NC (US); Russell Speight VanBlon, Raleigh, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 189 days.

(21) Appl. No.: 14/067,410

(22) Filed: Oct. 30, 2013

(65) Prior Publication Data

US 2015/0120282 A1  Apr. 30, 2015

(51) Int. Cl.
| | | |
|---|---|---|
| *G10L 15/00* | (2013.01) | |
| *G10L 13/00* | (2006.01) | |
| *G10L 21/00* | (2013.01) | |
| *G06F 17/27* | (2006.01) | |
| *G06F 17/22* | (2006.01) | |

(52) U.S. Cl.
CPC ........ *G06F 17/2785* (2013.01); *G06F 17/2264* (2013.01)

(58) Field of Classification Search
CPC ......... G10L 15/26; G10L 17/22; G10L 15/22; G10L 2015/223; G10L 15/00; G10L 13/00; G10L 21/10; G10L 13/02; G06F 3/167
USPC .......... 704/235, 246, 258, 260, 261, 270, 275
See application file for complete search history.

(56) References Cited

U.S. PATENT DOCUMENTS

| | | | | |
|---|---|---|---|---|
| 6,442,593 | B1 * | 8/2002 | Wang ...................... | H04L 51/26 709/206 |
| 6,820,113 | B2 * | 11/2004 | Wang et al. ................... | 709/206 |
| 7,580,838 | B2 * | 8/2009 | Divay ................. | G06F 17/2725 704/257 |
| 7,921,374 | B2 * | 4/2011 | Griffin .................. | G06F 3/0237 715/780 |
| 8,170,872 | B2 * | 5/2012 | Lyle ...................... | G06Q 10/107 379/88.17 |
| 8,219,397 | B2 * | 7/2012 | Jaiswal et al. ................ | 704/235 |
| 8,447,285 | B1 | 5/2013 | Blandon et al. | |
| 8,812,171 | B2 * | 8/2014 | Filev et al. ....................... | 701/1 |
| 8,949,128 | B2 * | 2/2015 | Meyer ..................... | G10L 13/04 379/88.16 |
| 9,015,046 | B2 * | 4/2015 | Pereg .................... | G06Q 10/063 379/265.01 |
| 2004/0138881 | A1 * | 7/2004 | Divay ................. | G06F 17/2725 704/231 |
| 2009/0055190 | A1 * | 2/2009 | Filev ..................... | B60W 50/10 704/270 |
| 2009/0306979 | A1 * | 12/2009 | Jaiswal ................. | G10L 15/063 704/235 |
| 2013/0038756 | A1 * | 2/2013 | Cheng ................ | H04N 21/4788 348/231.99 |
| 2014/0163980 | A1 * | 6/2014 | Tesch ..................... | G10L 21/10 704/235 |

* cited by examiner

*Primary Examiner* — Edgar Guerra-Erazo

(74) *Attorney, Agent, or Firm* — Ference & Associates LLC

(57) ABSTRACT

An aspect provides a method, identifying: receiving, at an input component of an information handling device, user input comprising one or more words; identifying, using a processor of the information handling device, an emotion associated with the one or more words; creating, using the processor, an emotion tag including the emotion associated with the one or more words; and storing the emotion tag in a memory. Other embodiments are described and claimed.

19 Claims, 4 Drawing Sheets

PRESERVING EMOTION OF USER INPUT

BACKGROUND

Information handling devices ("devices"), for example cell phones, smart phones, tablet devices, laptop and desktop computers, e-readers, etc., employ one or more input devices for entering input. Among these input devices are keyboards, touch screens, other input surfaces (e.g., digitizer), microphones for speech-to-text applications, cameras for detecting gestures, etc.

Commonly there are assistive technologies implemented for correcting or modifying user input automatically in an effort to provide automatic assistance to the user in the form of minor corrections or modifications/additions to the literal user input. For example, most applications now include some form of spell checking functionality, which in some forms auto-corrects commonly misspelled words without further user input. A further example includes supplying the correct contraction for a word form, e.g., "its" versus "it's" or "they're" for the literal input of "theyre". Often suggestions are provided or supplied for correcting words rather than automated correction thereof.

BRIEF SUMMARY

In summary, one aspect provides a method, comprising: receiving, at an input component of an information handling device, user input comprising one or more words; identifying, using a processor of the information handling device, an emotion associated with the one or more words; creating, using the processor, an emotion tag including the emotion associated with the one or more words; and storing the emotion tag in a memory.

Another aspect provides an information handling device, comprising: an input component; a processor; a memory device assessable to the processor and storing code executable by the processor to: receive, at an input component, user input comprising one or more words; identify an emotion associated with the one or more words; create an emotion tag including the emotion associated with the one or more words; and store the emotion tag in a memory.

A further aspect provides a program product, comprising: a storage device having computer readable program code stored therewith, the computer readable program code comprising: computer readable program code configured to receive, at an input component of an information handling device, user input comprising one or more words; computer readable program code configured to identify, using a processor of the information handling device, an emotion associated with the one or more words; computer readable program code configured to create, using the processor, an emotion tag including the emotion associated with the one or more words; and computer readable program code configured to store the emotion tag in a memory.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
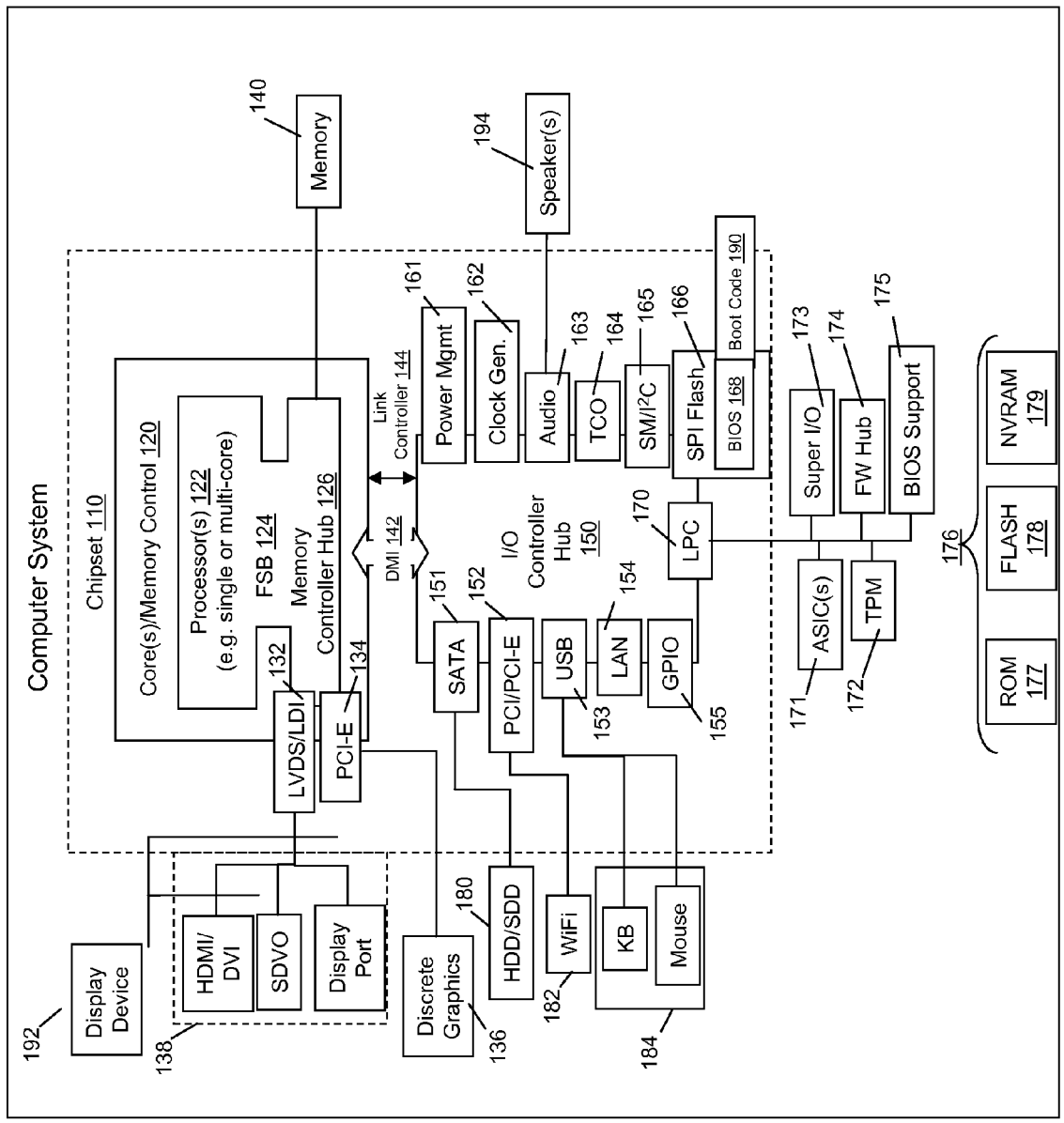
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While various methods have been established in an attempt to correct user input in an attempt to faithfully capture the literal text of the input, e.g., when speech is automatically converted to text by an information handling device (e.g., smart phone, tablet, laptop or desktop computer, etc.), the tone, inflection and emphasis of the user's input are lost. In this way, the textual representation is something less than the original user input. For example, there are no solutions to preserve in the machine text the tone or inflection or emphasis, or generally capture the emotion of the user, which is often used in natural language to enliven or enrich the communication. All prior solutions automatically convert user inputs (e.g., handwriting to machine text, speech-to-text, etc.) to render all words faithfully in a rigid format, e.g., all words or characters appearing in the same font, using the same font characteristics, etc.

Accordingly, an embodiment uses characteristics of the user input, e.g., sound characteristics such as changes in tone, inflection, volume and the like, to create meta data such as emotion tags. These emotion tags may then be analyzed by an embodiment to modify operations of an application. For example, an emotion tag may be utilized as a cue to render text in a way that preserves the character of the spoken word through visual emphasis (e.g., in an example where speech input has been provided by the user). Visual emphasis may include bolding the text, italicizing the text, capitalizing the text, lettering the text, underlining the text, modifying the font size of the text, using different font families, or some suitable combination of the foregoing. Moreover, emotion tags may be analyzed to modify the operation of applications in other ways. For example, in a search application, e.g., an email search application, a user may search not just based on text, timing, sender, and the like, but emotion may also be included as a search parameter. Various non-limiting example embodiments are described throughout.

The illustrated example embodiments will be best understood by reference to the figures. The following description is intended only by way of example, and simply illustrates certain example embodiments.

While various other circuits, circuitry or components may be utilized, FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1, may be used with applications that render user inputs in text form. This may include a variety of formats, for example rendering speech input as text or rendering handwriting input as text. The devices may utilize a variety of input components, alone or in combination, for detecting user inputs, such as input surfaces (e.g., touch screen or digitizer), microphones for speech-to-text applications, cameras for detecting gestures, etc. As described herein, embodiments analyze the user inputs to infer or determine the emotion(s) that should be associated with or tagged to the user inputs. Such data regarding identified emotion may be stored as meta data, e.g., as a tag including an emotion associated with a word or words of the user input, that may be utilized to enrich the user experience.

Figure 2:
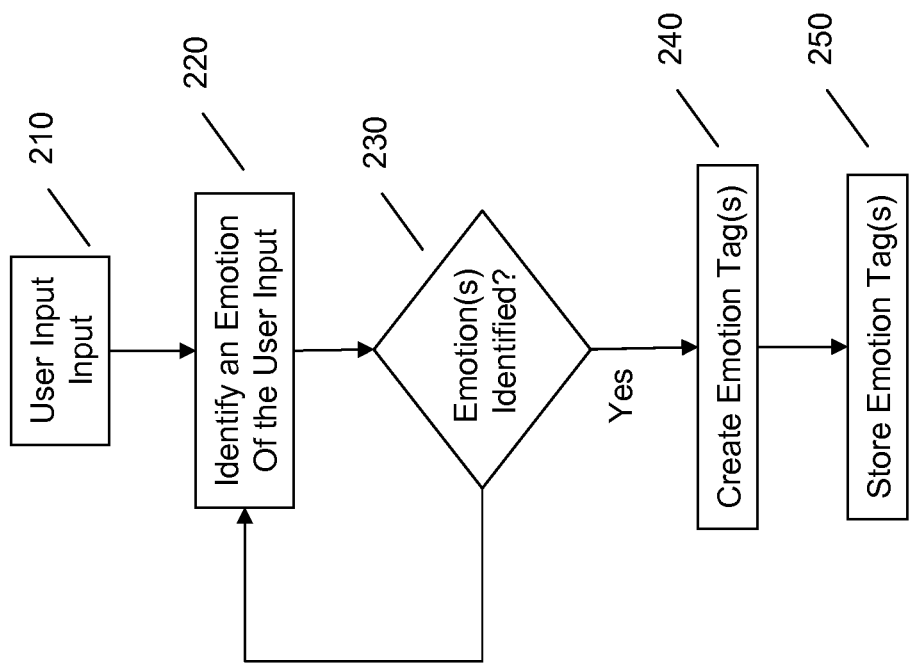
FIG. 2 illustrates an example method for preserving emotion of user input.

Referring to FIG. 2 for example, an embodiment first creates emotion tag(s) for user inputs. As illustrated, a user provides inputs at 210, e.g., to a microphone of an information handling device (laptop computer, tablet, smart phone, e-reader, etc.). This input may be parsed and analyzed to identify an emotion of the input at 220. For example, if the user provides speech input that is being converted into machine text, an analysis of the sound or acoustic characteristics of the audio signal may be utilized to infer or identify an emotion associated with a word or group of words of the input. Thus, an embodiment may utilize changes in tone, inflection and volume as cues to identify an emotion of the speech input at 220.

Analysis of how the value or content of these emotion tags change from word to word or phrase to phrase may form the basis for making rendering or modification decisions. An alternative method for noting changes in emotion, e.g., as discerned via tone, inflection and volume, etc., may include attaching a time stamp to each deciphered word (or segment of input) and comparing that to the input record (e.g., acoustic record). Another approach includes analyzing the input record (e.g., the acoustic record) using natural break points (e.g., silence) to identify word separation, then examining the acoustic values of the non-silent portions for relative changes in emotional content (e.g., tone, inflection, volume/amplitude, etc.). This results in a rendering map of the input record that may be used to identify which word(s) should be rendered "normally" (i.e., unmodified at 340) and which should receive some sort of emphasis or modification at 330, i.e., which inputs will have an emotion tag associated therewith.

An embodiment may be configurable to allow for variance in user input metrics (e.g., pitch, tone, volume, rapidity of speech from person to person, etc.) to be taken into account when determining or identifying an emotion for forming or creating emotion tag(s). The configuration may also include mapping emotions to particular modifications (e.g., to the input rendering itself, e.g., modifying particular font characteristics/font selection; and/or to application behaviors, as further described herein). Thus, the configurability allows for a range of modifications (e.g., visual representations, application behavior modifications, etc.) that remain within the user's control.

In terms of identifying an emotion, as another example, an embodiment may, in addition to analyzing the audio signal or in lieu thereof, analyze the content of the user input itself in an attempt to infer or identify an emotion at 220. For example, certain words or phrases may be mapped to certain emotions (anger, joy, excitement, concern, etc.). Thus, given the textual content of the user input, an embodiment may analyze the content of the user input provided at 210 to identify an emotion at 220.

If an emotion or emotions are not identified at 220, as determined at 230, an embodiment may not create an emotion tag and may, for example, wait for further user inputs that may be analyzed (alone or in combination with prior inputs) to determine or identify an emotion. However, if an embodiment identifies an emotion 220, an embodiment may create an emotion tag (or more than one emotion tag) at 240 and store the tag(s) at 250. An emotion tag includes meta data that associates the user input (e.g., word or phrase) with a predetermined emotion (e.g., anger, joy, excitement, concern, etc.). The store of emotion tag(s) may be used to modify the operation of various applications to enrich the user experience taking emotion of the input into consideration. The store of emotion tag(s) may be located locally on an information handling device or remotely, such that it is accessible to the information handling device over a network connection (e.g., in the cloud).

Figure 3:
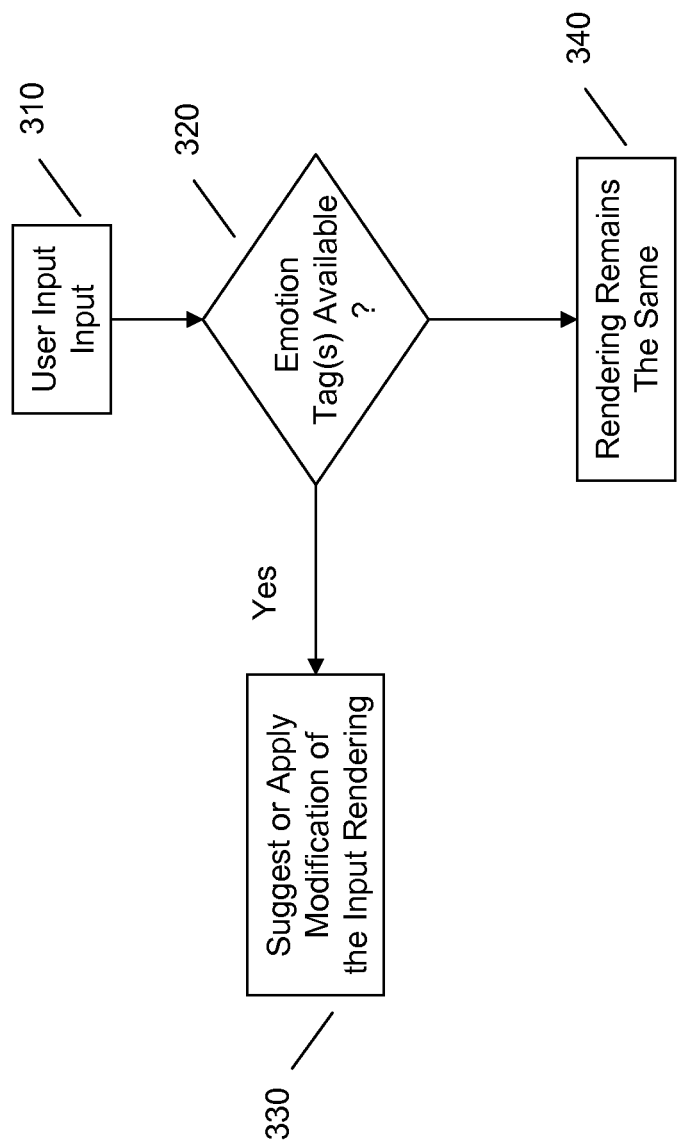
FIG. 3 illustrates an example method of applying a modification based on emotion tag(s).

For example, referring to FIG. 3, given user input at 310, an embodiment may identify an emotion tag is associated or available for the input at 320. This may include, in one example, the process outlined in FIG. 2, i.e., an identification of an emotion or emotions for the current user input, followed by creation of the emotion tag.

If an emotion tag is available (has been created) for the current input, an embodiment may suggest or automatically apply a modification to the input's visual rendering at 330. For example, if a user provides speech input of "what a wonderful time", an embodiment may analyze the user's input speech (e.g., in the form of the captured audio signal) to determine or identify an emotion with respect to the user input. Thus, the audio signal may include sound or acoustic characteristics of excitement, e.g., as identified at 220 of FIG. 2. Therefore, an embodiment may create an emotion tag including the emotion "excitement" and associate it with this particular user input. Various modifications may be assigned to various emotion tag(s).

Given the availability of an emotion tag for this input, an embodiment may suggest or apply a modification to the input rendering at 330 based on the emotion tag. For example, an embodiment may supplement the input rendering at 330 by adding an exclamation point to the end of the phrase "what a wonderful time" to render it as "what a wonderful time!" As another example, an embodiment may modify or change the input rendering to bold some or all of the input, e.g., modifying "what a wonderful time" to "what a wonderful time", where the word wonderful, having the acoustic characteristic tagged as excitement, is modified to have bold and underlined text. Thus, if an emotional tag is available for some or all of the user input, some or all of the user input may be modified; otherwise, the rendering may remain unmodified at 340.

Figure 4:
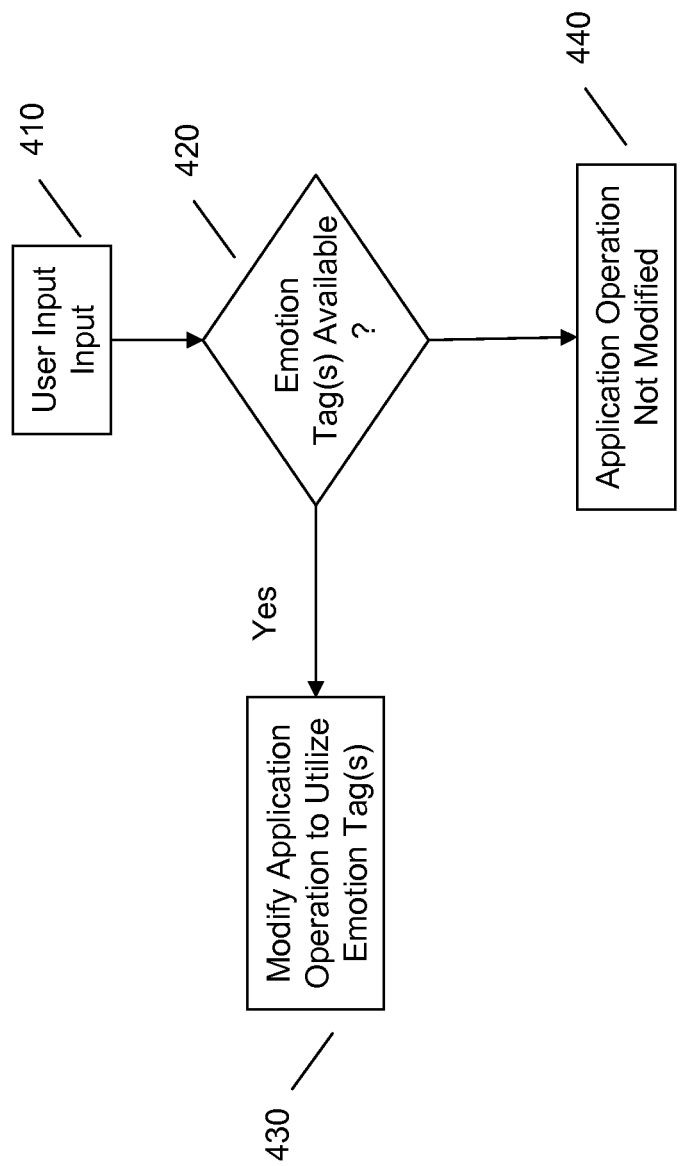
FIG. 4 illustrates another example method of applying a modification based on emotion tag(s).

As another example of utilizing the emotional tags, referring to FIG. 4, the operation of various applications may be modified. Thus, if a user provides input at 410 and an embodiment determines that an emotion tag is available for the input at 420, an embodiment may modify the default behavior of an application at 430 on that basis. As an example, an embodiment may receive user input of a user forming an email message that ends with "This must be done by 4 p.m." An embodiment may form, e.g., using the process outlined in FIG. 2, an emotion tag for this phrase of importance or priority. Thus, at 420 an embodiment may identify that this user input has an emotional tag available and at 430 modify the operation of the email application to automatically list this message as high priority, e.g., prior to sending the message.

As another example of modifying the operation of an application, an embodiment may utilize previously formed tags, e.g., to assist in a search application. Using an email application as another example, a user may wish to retrieve an email message from the past but only remember that it was sent sometime last week and the user was excited about a birthday celebration. Further assuming that the email does not contain text indicating "birthday", "excited" or the like, but rather simply the text "what a wonderful time".

An embodiment may utilize an analysis of stored emotion tags to modify or supplement the email search utility in an effort to identify the message. For example, if a user provides search input at 410 of "excited last week", an embodiment may determine at 420 that emotion tags are available to modify or assist the search. Thus, at 430, rather than simply performing a text based search of emails from last week using the input provided at 410, an embodiment may additionally search for the emotion "excited" among the store of emotion tags.

As with the example described in connection with FIG. 3, using an embodiment, an emotion tag of "excitement" may have been created for the prior user input (e.g., in an email) "what a wonderful time". Accordingly, an embodiment may retrieve this email message because it has the emotion tag "excitement" associated with its content "what a wonderful time". That is, an embodiment may take the search input at 410 of "excited last week", identify "excited" as equivalent to "excitement", and locate messages tagged with "excitement". Further, given the input "last week", an embodiment may narrow down the search results using a time analysis included with the message and/or included with the emotion tag itself. Accordingly, an embodiment will be able to provide a different search result utilizing the searching of stored emotion tags.

Embodiments therefore act to identify and preserve the emotion(s) associated with various user inputs, e.g., speech inputs. Given the identification and association of emotions with user inputs, embodiments may leverage the identified emotions to modify user inputs and/or alter or modify the behavior of applications. As may be appreciated from the foregoing, preservation and use of emotional content of user inputs provides a variety of opportunities for enhancing user inputs and application behaviors.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium is a non-signal medium that may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection, or NFC.

Aspects are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an input component of an information handling device, user input comprising one or more words;
   identifying, using a processor of the information handling device, an emotion associated with the one or more words;
   creating, using the processor, an emotion tag including the emotion associated with the one or more words;
   storing the emotion tag in a memory;
   analyzing one or more emotion tags; and
   modifying the user input based on the analyzing, wherein modifying comprises changing a visual rendering of the user input.

2. The method of claim 1, wherein the storing of the emotion tag in a memory occurs remote from the information handling device.

3. The method of claim 1, wherein the storing of the emotion tag in a memory occurs locally to the information handling device.

4. The method of claim 1, wherein:
   the user input comprises speech input; and
   the identifying an emotion associated with the one or more words comprises using an acoustic characteristic of the speech input to identify an emotion.

5. The method of claim 4, further comprising:
   receiving additional speech input;
   wherein the using an acoustic characteristic of the speech input to identify an emotion comprises comparing an acoustic characteristic of the speech input to an acoustic characteristic of the additional speech input.

6. The method of claim 1, further comprising:
   analyzing one or more emotion tags; and
   modifying operation of an application based on the analyzing.

7. The method of claim 6, wherein the modifying an operation of an application comprises supplementing a search application result utilizing emotion tag searching.

8. The method of claim 6, wherein the modifying an operation of an application comprises providing a prompt to a user prior to sending a message including the user input.

9. The method of claim 6, wherein the modifying an operation of an application comprises assigning a priority level to a message including the user input.

10. An information handling device, comprising:
    an input component;
    a processor;
    a memory device assessable to the processor and storing code executable by the processor to:
    receive, at an input component, user input comprising one or more words;
    identify an emotion associated with the one or more words;
    create an emotion tag including the emotion associated with the one or more words;
    store the emotion tag in a memory;
    analyze one or more emotion tags; and
    modify the user input based on the analyzing, wherein to modify comprises changing a visual rendering of the user input.

11. The information handling device of claim 10, wherein storing of the emotion tag in a memory occurs remote from the information handling device.

12. The information handling device of claim 10, wherein storing of the emotion tag in a memory occurs locally to the information handling device.

13. The information handling device of claim 10, wherein:
    the user input comprises speech input; and
    to identify an emotion associated with the one or more words comprises using an acoustic characteristic of the speech input to identify an emotion.

14. The information handling device of claim 13, wherein the code is further executable by the processor to:
    receive additional speech input;
    wherein the using an acoustic characteristic of the speech input to identify an emotion comprises comparing an acoustic characteristic of the speech input to an acoustic characteristic of the additional speech input.

15. The information handling device of claim 10, wherein the code is further executable by the processors to:
    analyze one or more emotion tags; and
    modify operation of an application based on the analyzing.

16. The information handling device of claim 15, wherein to modify an operation of an application comprises supplementing a search application result utilizing emotion tag searching.

17. The information handling device of claim 15, wherein to modify an operation of an application comprises providing a prompt to a user prior to sending a message including the user input.

18. The information handling device of claim 15, wherein to modify an operation of an application comprises assigning a priority level to a message including the user input.

19. A program product, comprising:
a storage device having computer readable program code stored therewith, the computer readable program code being executable by a processor and comprising:
computer readable program code that receives, at an input component of an information handling device, user input comprising one or more words;
computer readable program code that identifies, using a processor of the information handling device, an emotion associated with the one or more words;
computer readable program code that creates, using the processor, an emotion tag including the emotion associated with the one or more words; and
computer readable program code that stores the emotion tag in a memory;
computer readable program code that analyzes one or more emotion tags; and
computer readable program code that modifies the user input based on the analyzing, wherein to modify comprises changing a visual rendering of the user input.

\* \* \* \* \*